(12) United States Patent
King et al.

(10) Patent No.: US 6,486,568 B1
(45) Date of Patent: Nov. 26, 2002

(54) POWER SYSTEM USING A MULTI-FUNCTIONAL POWER INTERFACE UNIT

(75) Inventors: Robert Dean King, Schenectady, NY (US); Neil Richard Garrigan, Niskayuna, NY (US); Mark Edward Cardinal, Altamont, NY (US); Lembit Salasoo, Niskayuna, NY (US)

(73) Assignee: General Electric Company

( * ) Notice: Subject to any disclaimer, the term of this patent is extended or adjusted under 35 U.S.C. 154(b) by 0 days.

(21) Appl. No.: 09/469,129

(22) Filed: Dec. 21, 1999

(51) Int. Cl.[7] .................................................. H02J 5/00
(52) U.S. Cl. .................................... 307/66; 307/9.1
(58) Field of Search ............................ 307/18, 23, 47, 307/48, 64–68, 9.1, 10.1, 84

(56) References Cited

U.S. PATENT DOCUMENTS

| | | | | |
|---|---|---|---|---|
| RE29,579 E | * | 3/1978 | Simon | 307/68 |
| 4,645,940 A | * | 2/1987 | Wertheim | 307/66 |
| 5,334,878 A | * | 8/1994 | Vanek et al. | 307/64 |
| 5,528,445 A | * | 6/1996 | Cooke et al. | 361/20 |
| 5,552,681 A | * | 9/1996 | Suzuki et al. | 307/66 |
| 5,903,449 A | | 5/1999 | Garrigan et al. | |
| 5,929,537 A | * | 7/1999 | Glennon | 307/46 |
| 5,998,885 A | * | 12/1999 | Tamor et al. | 307/10.1 |

* cited by examiner

Primary Examiner—Fritz Fleming
(74) Attorney, Agent, or Firm—Ann Marie Agosti; Enrique J. Mora; Beusse, Brownlee, Bowdoin & Wolter, PA (57) ABSTRACT

A power system for a locomotive generally having an internal combustion engine coupled to drive a main alternator and an auxiliary alternator is provided. The main alternator is coupled to power one or more traction motors and the auxiliary alternator is coupled to power predetermined electrical equipment. The system includes a main power bus generally powered by the main alternator and an auxiliary power bus generally powered by the auxiliary alternator. A power interface unit is electrically coupled to the main power bus to capture and transfer electrical energy into the auxiliary power bus. The electrical energy may be generated during a predetermined mode of operation of the locomotive, such as during dynamic braking or self-load.

29 Claims, 8 Drawing Sheets

POWER SYSTEM USING A MULTI-FUNCTIONAL POWER INTERFACE UNIT

BACKGROUND OF THE INVENTION

The present invention is generally related to power systems, and more particularly, is related to a power system using a multi-functional power interface unit that allows, among other things, for capturing electrical energy that otherwise would be lost in a system, such as a locomotive, etc.

Locomotives, due to various constraints such as cost, space, power interface compatibility, etc., generally do not have on-board energy storage, therefore the electrical energy that is produced during dynamic braking or in a self-load mode of operation is dissipated in large grids of resistors to maintain train speed during operation on down hill grades or during train deceleration. As suggested above, any viable installation of on-board storage in the locomotive needs to overcome the foregoing constraints in order to allow a locomotive manufacturer to provide a cost-effective and reliable solution to the needs of its customers and/or government regulators to supply even more energy-efficient locomotives. Thus, it would be desirable to provide a power system that uses a versatile power electronic interface and associated control capable of overcoming the foregoing constraints. For example, it would be desirable for the power interface unit to perform at least the following functions:

1). The interface unit should allow at least a portion of the energy that would be irretrievably lost in the standard dynamic brake (DB) grid resistors to be captured and utilized to operate, for example, electrical equipment generally powered through an auxiliary power bus of the locomotive. Examples of electrical equipment powered by the auxiliary may include motor loads, such as radiator fans, traction motor blower, alternator blower, air compressor, etc. It will thus be appreciated that this first function would allow for increasing the locomotive fuel economy while reducing engine emissions.

2). The same interface unit could further allow to be electrically reconnected, via suitable switches, along with appropriate software control, to provide excitation to a main traction alternator during cranking of the locomotive's engine. This second function could allow to utilize the captured electrical energy to charge a suitable storage unit that in turn may be connected to power up the interface unit so as to excite the main traction alternator to provide mechanical power to the engine during an engine cranking mode of operation.

BRIEF SUMMARY OF THE INVENTION

Generally speaking, one embodiment of the present invention fulfills the foregoing needs by providing a power system for a locomotive generally having an internal combustion engine coupled to drive a main alternator and an auxiliary alternator. The main alternator is coupled to power one or more traction motors and the auxiliary alternator is coupled to power predetermined electrical equipment. The system includes a main power bus generally powered by the main alternator. The system further includes an auxiliary power bus generally powered by the auxiliary alternator. A power interface unit is electrically coupled to the main power bus to capture and transfer electrical energy into the auxiliary power bus. The electrical energy may be generated during a predetermined mode of operation of the locomotive, such as during dynamic braking or self-load.

Another embodiment of the present invention further fulfills the foregoing needs by providing a power interface unit in a power system for a locomotive generally having an internal combustion engine coupled to drive a main alternator and an auxiliary alternator. The main alternator is coupled to power through a main power bus one or more traction motors and the auxiliary alternator is coupled to power through an auxiliary power bus predetermined electrical equipment. The power interface unit is electrically coupled to the main power bus to capture and transfer electrical energy into the auxiliary power bus. The electrical energy may be generated during a predetermined mode of operation of the locomotive. The power interface unit includes a voltage converter module selectively coupled to impart a desired voltage conversion to convert the voltage from the main power bus to the auxiliary power bus during selected modes of operation, including transfer of a portion of the power generated during dynamic braking. Power propagating between the main power bus and the auxiliary power bus allows the captured electrical energy to be utilized to operate the auxiliaries and/or stored in an energy storage device. An inverter module is selectively coupled in the interface unit to drive the main alternator during an engine cranking mode of operation.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
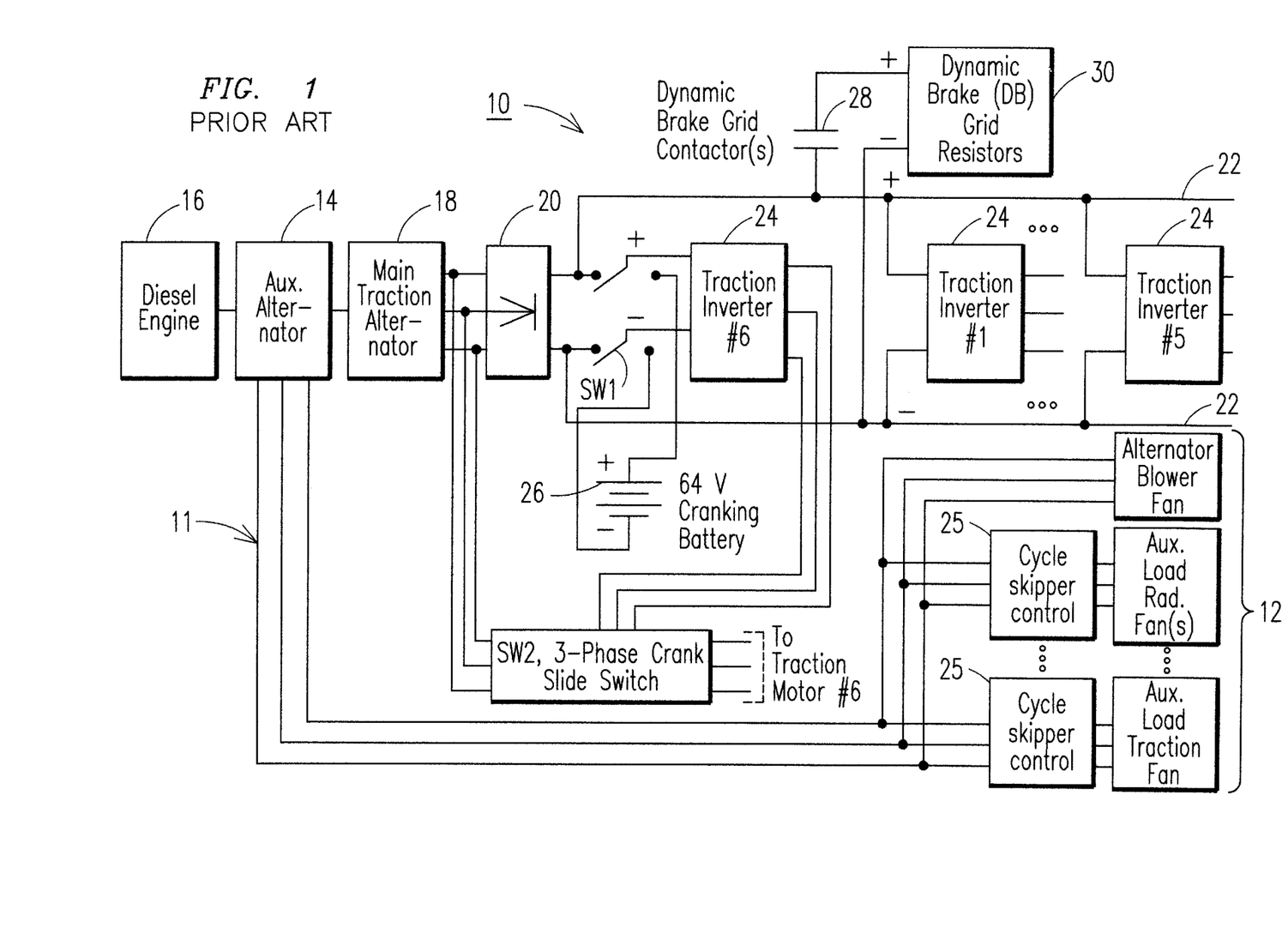
FIG. 1 is block diagram schematic of a known locomotive power system.

FIG. 1 illustrates an exemplary prior art locomotive power system 10 wherein a locomotive using the power system of FIG. 1 would power up through an auxiliary alternating current (AC) power bus 11 predetermined electrical equipment, such as the various ac loads 12 (radiator cooling fans, alternator blower, traction blower, air compressor, etc.), from a 3-phase auxiliary alternator 14. An internal combustion engine, such as a diesel engine 16, is mechanically coupled to drive auxiliary alternator 14 and a main alternator, such as a main traction alternator 18. A rectifier 20 provides suitable rectification to the AC output from main alternator 18 to power up a main direct current (DC) power bus 22 having respective DC rails each carrying a voltage of opposite polarity with respect to one another. A plurality of traction inverters 24, which in turn drive one or more of a plurality of traction motors (not shown), receives power through main power bus 22. The excitation frequency that determines the speed of auxiliary loads 12 is provided by the auxiliary alternator 14, and the output frequency of alternator 14 is a direct function of the diesel engine speed, e.g., revolutions per minute (RPM). Thus, it will be appreciated that in the power system of FIG. 1 since there is direct electrical coupling of the auxiliary loads 12, such as fan motors, etc., to the auxiliary alternator 14, then the speed of each auxiliary motor load is directly linked to the diesel engine speed. It is known that some limited speed selection may be provided to the auxiliary motor loads. For example, two-speed motor control may be provided via electrical contactor switching to switch the stator windings of the motor loads, and two-speed or three-speed control may be provided via one or more cycle skippers 25. The auxiliary motor load speeds provided by these speed selection methods are limited by the diesel engine RPM.

As suggested above, while using dynamic braking, that is, when mechanical torque received by the traction motors causes the motors to function as alternators, a contactor 28 may be used to electrically couple the traction motors through the respective traction inverters to a resistive grid 30 and there may be a substantial voltage drop across the resistive grid so as to dissipate electrical energy and avoid damage to the various electrical components of the power system. Thus, in typical operation, resistive grid 30 may dissipate significant amounts of electrical energy when the locomotive is in the dynamic braking mode of operation, or when the resistive grid is used to test load the main alternator of the locomotive during a self-load mode of operation during which the traction motors are effectively disconnected and thus the self-load testing mode is performed without moving the locomotive. The traction motors may be effectively decoupled from resistive grid 30 through contactor 28 so that when the locomotive is motoring, that is, when the traction motors supply mechanical torque to the axle-wheels of the locomotive, there is no significant voltage drop across the resistive grid.

In another aspect of the power system of FIG. 1, a cranking function of engine 16 is provided by using either a separate cranking inverter, or by electrically switching one of the traction inverters 24 (e.g., the traction inverter labeled as inverter #6) during the cranking operation. In the exemplary configuration shown in FIG. 1, a switch SW1 (e.g., a two-pole-double-throw switch) is used to connect a storage unit 26 rated to have a relatively low voltage (e.g., a 64 V nominal battery) to the DC input of the traction inverter, and a switch SW2 (e.g., 3-phase slide switch) is used to connect the traction inverter three phase output to the leads that would normally provide the main alternator 3-phase output to the main rectifier (but in this case receive a 3-phase input signal), to operate alternator 18 as a cranking motor for the diesel engine, while in the engine cranking mode of operation.

Figure 2:
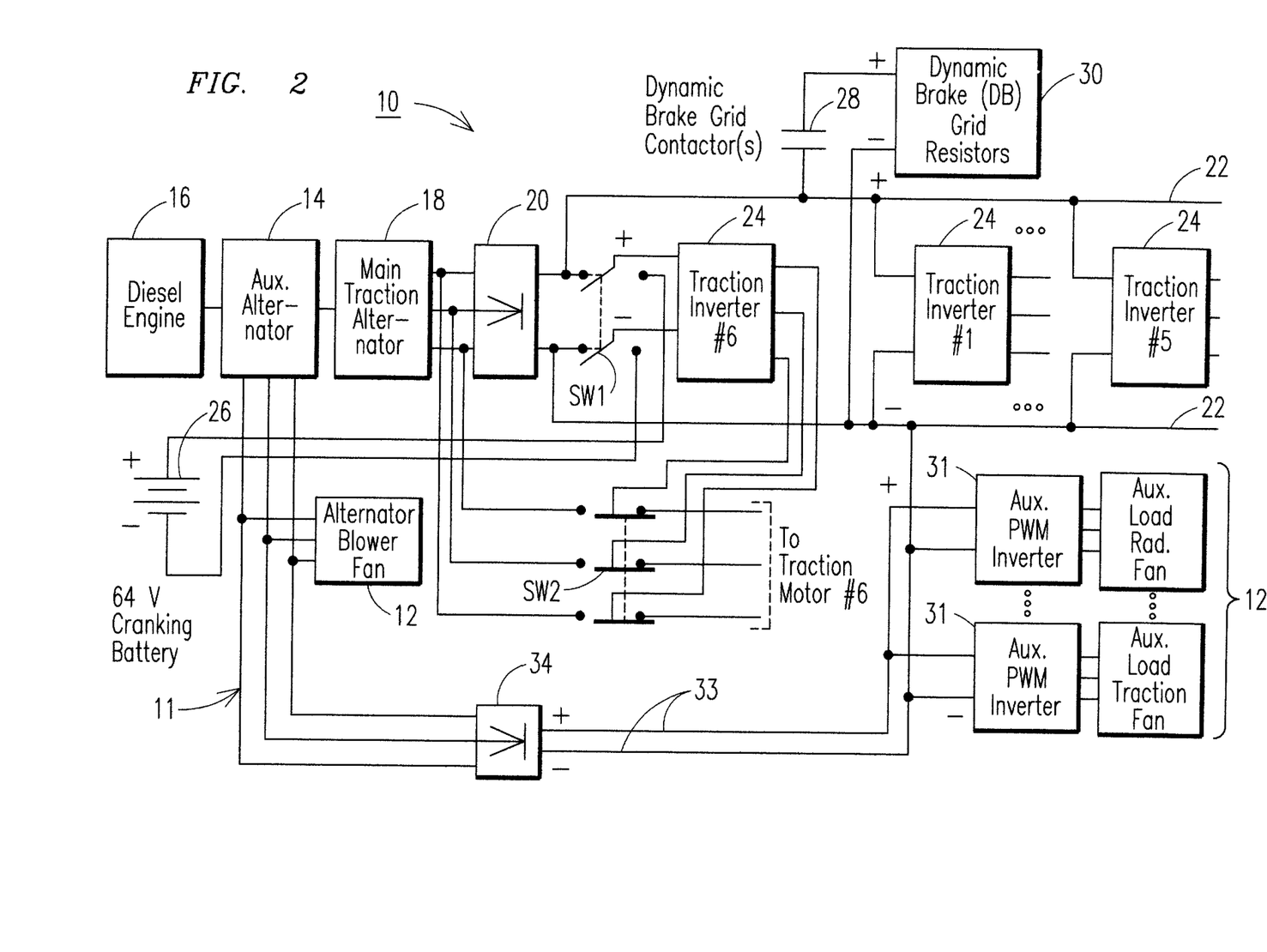
FIG. 2 is a block diagram schematic of an exemplary embodiment of the power system of the present invention that allows for providing continuously variable speed selectivity to loads in an auxiliary bus.

FIG. 2 shows one exemplary embodiment of the power system of the present invention wherein the cycle skippers 25 (FIG. 1) that provide limited three-speed auxiliary drive controls to loads 12 are replaced with respective inverters 31. Each of the inverters is configured to provide continuously adjustable speed drive to any motor loads 12 connected to the respective inverters 31 using, for example, externally-derived pulse width modulated (PWM) control signals, using PWM techniques well-understood by those of ordinary skill in the art, such as sinusoidal PWM or other PWM techniques Electrical excitation for an auxiliary DC power bus 32 that supplies power to each of the PWM inverters 31 is provided by a standard three-phase rectifier 34 coupled to the output terminals of auxiliary alternator 14. By way of example and not of limitation, typical voltage of the DC bus 33 at maximum diesel engine speed may be about 546 V. A crank function, as described in the power system of FIG. 1, is provided by the embodiment of FIG. 2 using switch SW1 and switch SW2 to switch one of the traction inverters (e.g., the traction inverter labeled as traction inverter #6) to main alternator 18 while receiving power from cranking battery 26. As will be appreciated by those skilled in the art, one advantage of this configuration is that the auxiliary loads 12, operated by the PWM inverters 31, provide continuous speed control and are effectively decoupled from undesired speed variation due to changes in the RPM of the diesel engine. This embodiment is believed to eliminate the severe engine transient loads generally experienced during the cycle skipper speed changing modes as well as significant harmonic power loss at quarter speed operating point, for example. Due to improved speed control of the various motor fans powered by inverters 31, this embodiment is also expected to result in improved engine cooling plus enhanced manifold air inlet temperature control, thus reducing engine emissions and reducing locomotive fuel consumption while providing improved locomotive operation under severe environmental conditions, such as locomotive operation in tunnels, etc.

Figure 3:
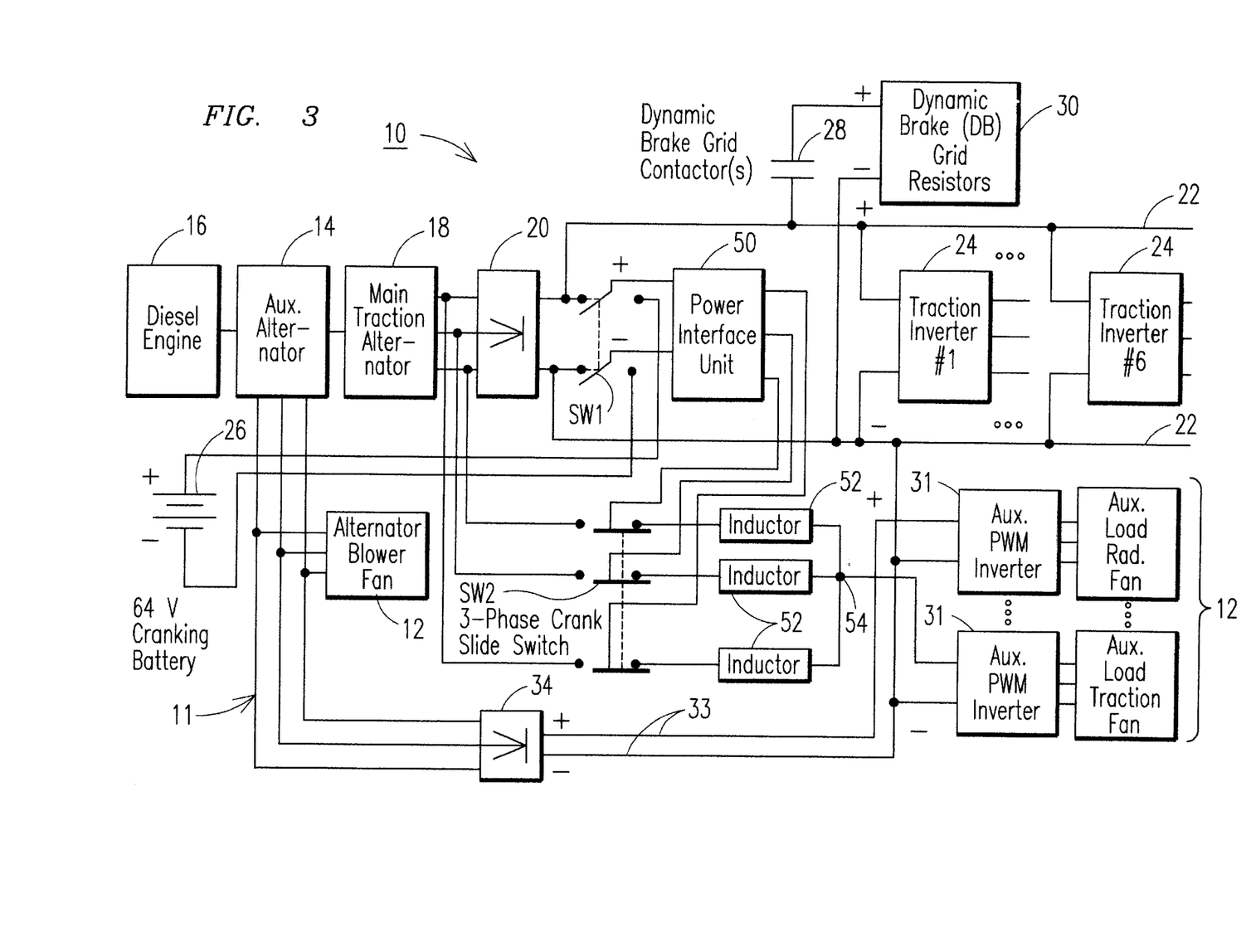
FIG. 3 is a block diagram of another exemplary embodiment of the power system of the present invention that uses a power interface unit that may configured either as an inverter or as DC-to-DC voltage converter.

FIG. 3 shows another exemplary embodiment of the power system of present invention. In this embodiment one of the traction inverters 24 (e.g., the inverter labeled as traction inverter #6 in FIGS. 1 and 2) is replaced with a power interface unit 50 that, as further explained below provides a dual interface functionality since such interface unit may be selected to operate either as an inverter, e.g., providing DC-to-AC inversion, or a converter, e.g., proving DC-to-DC power conversion. In one advantageous feature of the present invention, the power interface unit may be conveniently chosen to have an identical hardware bridge and dc link filter configuration as any standard 3-phase two-level traction inverter using inverter architectures readily understood by those of ordinary skill in the art of power electronics. However, in lieu of having to use different hardware to implement the foregoing multiple interface functions, a software control module, as may be implemented in a suitable signal processor, allows for selectably reconfiguring the power interface unit 50 from a traction inverter to a DC-to-DC converter having one or more individual converter legs (e.g., three legs) that may be respectively electrically coupled through switch SW2, (e.g., the 3-phase crank slide switch) to a respective terminal of a set of three interface inductors 50. The output terminal of the three inductors, may be tied to a common node 54, as shown in FIG. 3, to form, for example, the positive output of the DC/DC converter. The negative output of the DC/DC converter may be common with the negative rail of the main traction DC bus from the rectifier 20. While power interface unit 50 operates as a DC/DC converter, switch SW1 connects the DC power input terminals of power interface unit 50 to the main traction DC bus. By way of example and not of limitation, the control module for each leg of the DC/DC converter may be based on the techniques described below in the context of FIGS. 4 and 5. For readers requiring further background information on voltage regulation, see U.S. Pat. No. 5,903,449, commonly assigned to the same assignee of the present invention and herein incorporated by reference.

Figure 4:
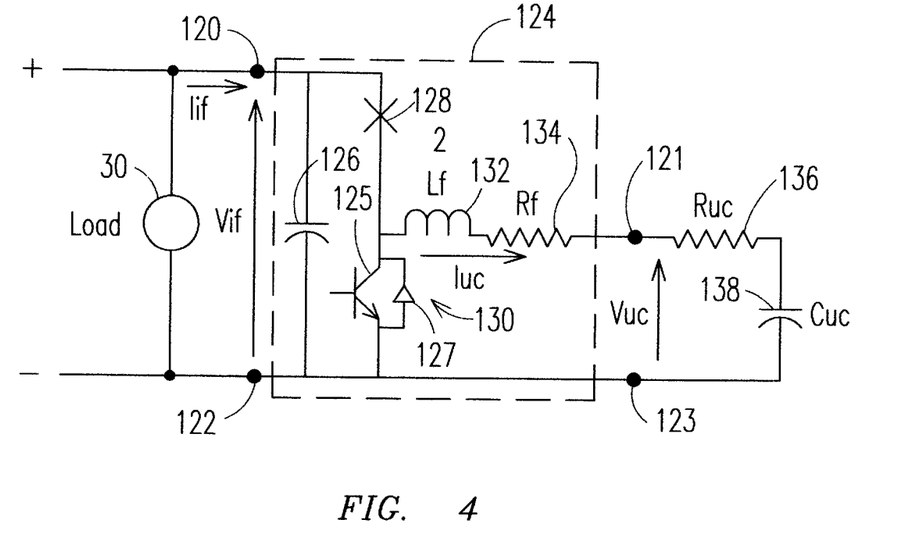
FIG. 4 is a circuit diagram of a voltage converting leg used in the voltage converter of FIG. 3.
Figure 5:
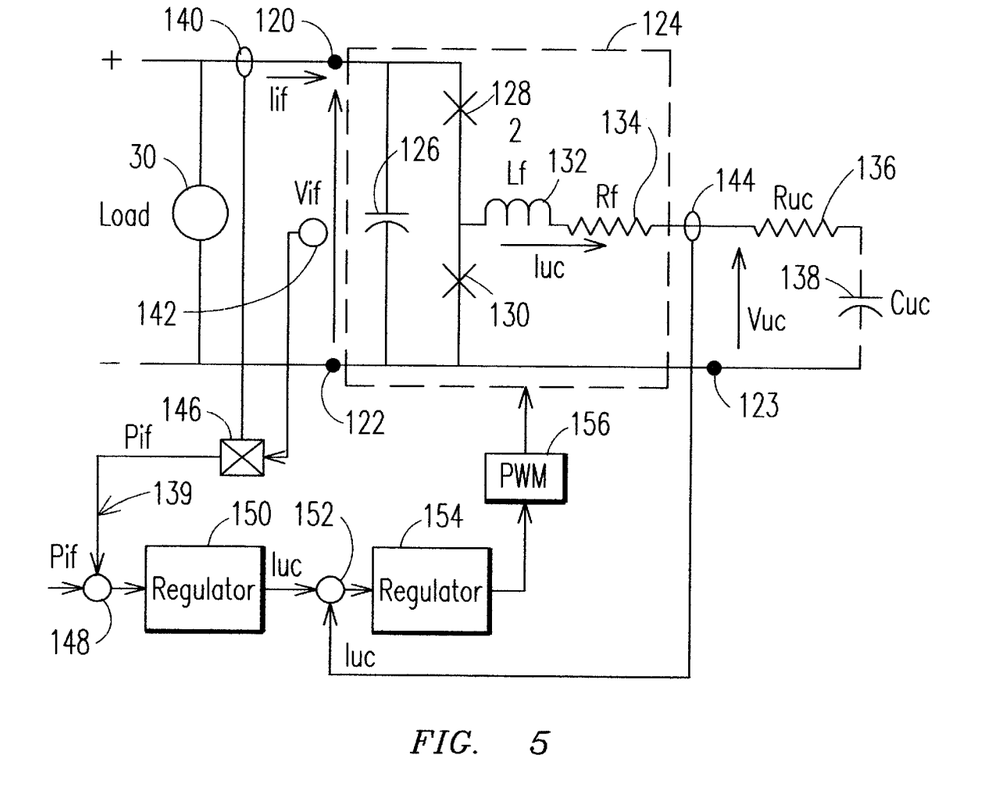
FIG. 5 is a schematic of a control system that may be used for the voltage converter leg of FIG. 4.

FIGS. 4 and 5 below describe details in connection with each of the legs of the converter module used in power interface unit 50. In the circuit diagram of FIG. 4, a power bus, such as main traction bus 22 (FIG. 3), supplies power to a load, such as grid resistors 30 (FIG. 3) which is coupled to an auxiliary energy storage device through an interface having multiple converter legs, each one configured such as the single voltage converter leg 124 shown in FIGS. 4 and 5. For purposes of example, the auxiliary energy storage device is shown as an ultra-capacitor 138 having a resistance 136. Other types of appropriate auxiliary energy storage devices include, for example, batteries, super-conducting magnetic electric storage devices, and flywheels.

Each voltage converter leg 124 may comprise, for example, a capacitor 126 coupled in parallel with the load and in parallel with two series coupled electrical switches 128 and 130. One of the switches, shown as switch 130, is coupled in parallel with the auxiliary energy storage device. Typically each switch includes an electronic switch 125 such as an IGBT (insulated gate bipolar transistor) or a MOSFET (metal oxide semiconductor field effect transistor) coupled in anti-parallel with a diode 127. The inductance and resistance of the converter are represented by interface inductor 132 and interface resistor 134. The terminals of the converter on the power bus/load side of the converter are hereinafter referred to as input terminals 120 and 122, and the terminals of the converter on the auxiliary energy storage device side of the converter are hereinafter referred to as output terminals 121 and 123.

FIG. 5 is a circuit diagram of a power control system 139 for the leg converter of FIG. 4. As described in the foregoing patent, the current flowing in the auxiliary energy storage device is regulated by measuring the auxiliary energy storage device current signal Iuc with a sensor 144 and comparing measured current signal Iuc with a commanded reference current signal Iuc* at current comparator 152. The current comparison signal (the difference between the currents) is regulated with a pulse width modulator (PWM) current regulator 154 which may comprise a proportional regulator, a proportional and integral regulator, a hysteresis regulator, or any other regulator capable of generating a duty cycle command signal for a PWM 156 such that the voltage applied to the output terminals is appropriate for reducing the error in current Iuc. The PWM receives the duty cycle command signal and converts it into pulses for switching switches 128 and 130. The PWM sends signals to control switches 128 and 130 to provide the desired power to the auxiliary energy storage device.

As shown in FIG. 5, the power on the input terminals of the converter leg is regulated by determining actual power Pif delivered to/received from leg converter 124 and comparing that power signal to a commanded reference signal Pif* with a power comparator 148. The power comparator generates a power comparison signal and sends the power comparison signal to a regulator 150 such as a proportion integral regulator which generates the commanded current signal Iuc*. By way of example, the power signal Pif may be determined by measuring current with a current sensor 140, measuring voltage with a voltage sensor 142, and multiplying the measured current and voltage signals with a multiplier 146. Because the measurements are across the power bus/load side of the converter, this method is useful for automatically adjusting for disturbances introduced through the power conversion stage of the converter circuit from circuitry losses, voltage variations in the auxiliary energy storage device and the DC bus, and non-linearities in the PWM conversion.

Returning to the embodiment of FIG. 3, it will thus be appreciated that the power command input to the power interface unit 50 when configured as a DC/DC converter, as described above in the context of FIGS. 4 and 5, would be based on the specific requirements of auxiliary loads 12 and would allow the auxiliary DC bus voltage to be controlled and optimized within preset thresholds above the rectified voltage from the three-phase auxiliary alternator 14 that is directly related to the diesel engine speed. Similar to the embodiment described in FIG. 2, when switch SW1 and switch SW2 is each respectively set to the crank mode and the processor of the power interface unit is reconfigured to operate as a traction inverter, this embodiment would also allow the crank operation of the diesel engine using stored energy from the locomotive cranking battery 26.

As will be appreciated by those skilled in the art, at least the following three advantages are believed to be fulfilled by the embodiment of FIG. 3:1). The DC link for the auxiliary PWM inverters 31 can be optimized for system efficiency and transient response, independent of the speed of the diesel engine as in the standard configuration described in the context of FIG. 1, 2). During dynamic braking mode of operation, a portion of the energy that otherwise is wasted in a conventional system within the dynamic brake (grid) resistors, can now be captured and used to supply the energy to operate the required locomotive auxiliary loads 12, i.e. radiator fans, alternator blower fans, air compressors, etc. This configuration will increase locomotive fuel economy, reduce emissions, and improve the reliability of the dynamic brake components as a result of less heat dissipation on the conventional dynamic brake resistor components, and 3). When operating in the DC/DC converter mode, the system is tolerant to the occurrence of faults that could occur in one or more of the converter legs. The faults that could occur include non-shoot-through faults, etc. For example, if a switching device or a sensor fails in one of the converter legs and upon its detection, a power system controller can disable the one of the three converter legs that is failing and, with the remaining two converter legs, all auxiliary loads would still be able to function at reduced power level. It will be appreciated that under such condition, there may be some reduction in the amount of dynamic braking energy that could be ultimately captured and also there maybe some reduction in the efficiency of the auxiliary subsystem. In a most severe condition where all three DC/DC converter legs fail to operate, the auxiliary PWM drives could still operate at a sub-optimal efficiency from the rectified auxiliary alternator excitation. Under DC/DC converter fault condition of one or more legs, the power interface unit would likely be unable to operate in the inverter mode of operation to provide the crank mode of operation.

Figure 6:
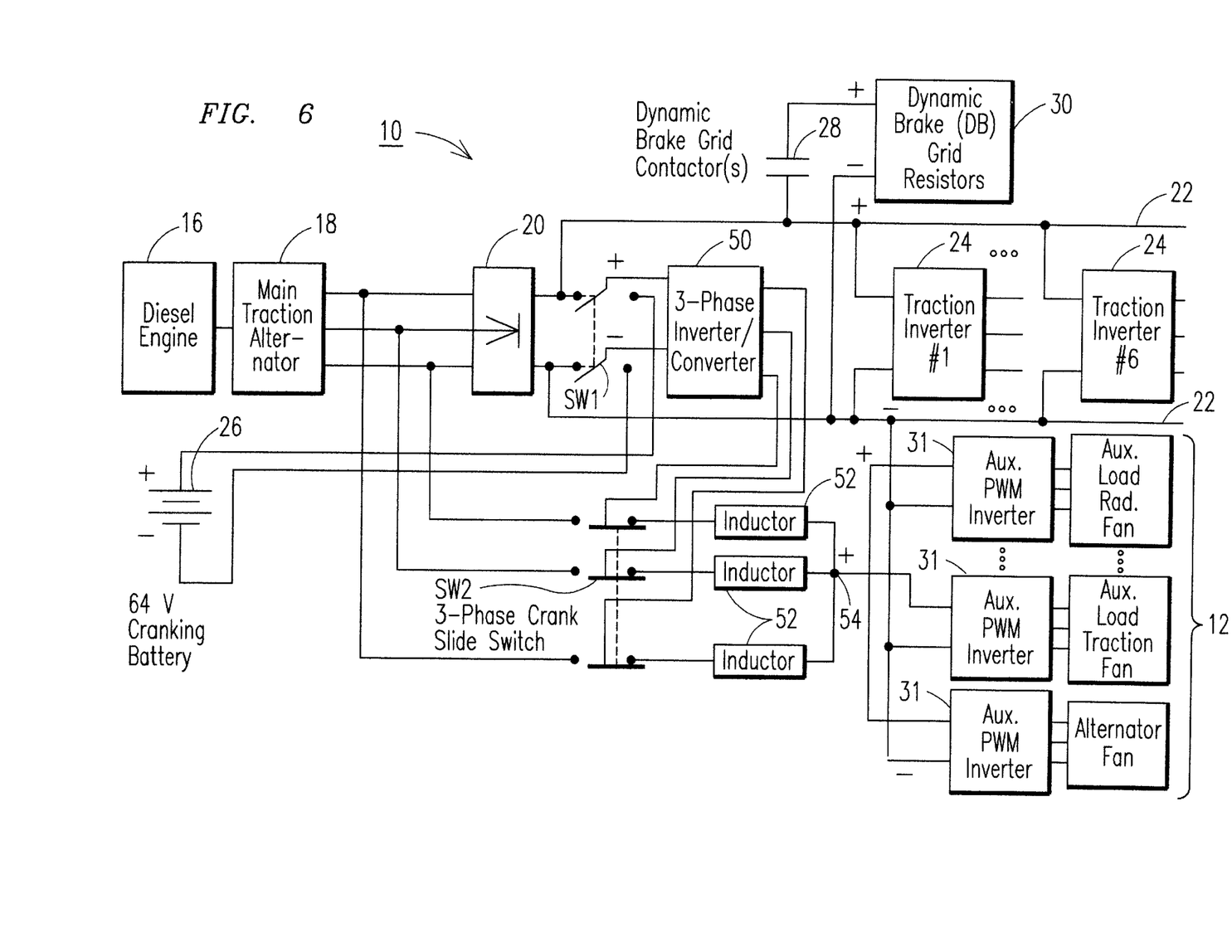
FIG. 6 is a block diagram schematic of another exemplary embodiment of the power system of the present invention that allows for optionally removing an auxiliary alternator for powering an auxiliary power bus.

FIG. 6 shows another embodiment of the power system of the present invention. In this embodiment, each auxiliary load 12 is powered from the main traction DC Link via the power interface unit 50 when operating as a DC/DC converter. This embodiment may allow the locomotive designer to consider the potential elimination of the auxiliary alternator 14 (FIGS. 2 and 3). It will be appreciated that in this embodiment, an AC motor load 12, such as the block identified as alternator blower fan and illustrated in FIGS. 2 and 3, or any other AC motor loads that otherwise would be directly coupled to the auxiliary alternator would in this case, in the absence of the auxiliary alternator, be driven with a respective adjustable speed PWM inverter drive 31. Similar to the embodiments described in FIGS. 2 and 3, when switches SW1 and SW2 are respectively set to the crank mode and the processor of the power interface unit is reconfigured to the traction inverter, this embodiment would allow the crank operation of the diesel engine using stored energy from the locomotive cranking battery 26. This embodiment will also exhibit substantial tolerance to failures in non-cranking modes in one or possibly two legs of the DC/DC converter, depending on the relative power rating of each particular leg.

Figure 7:
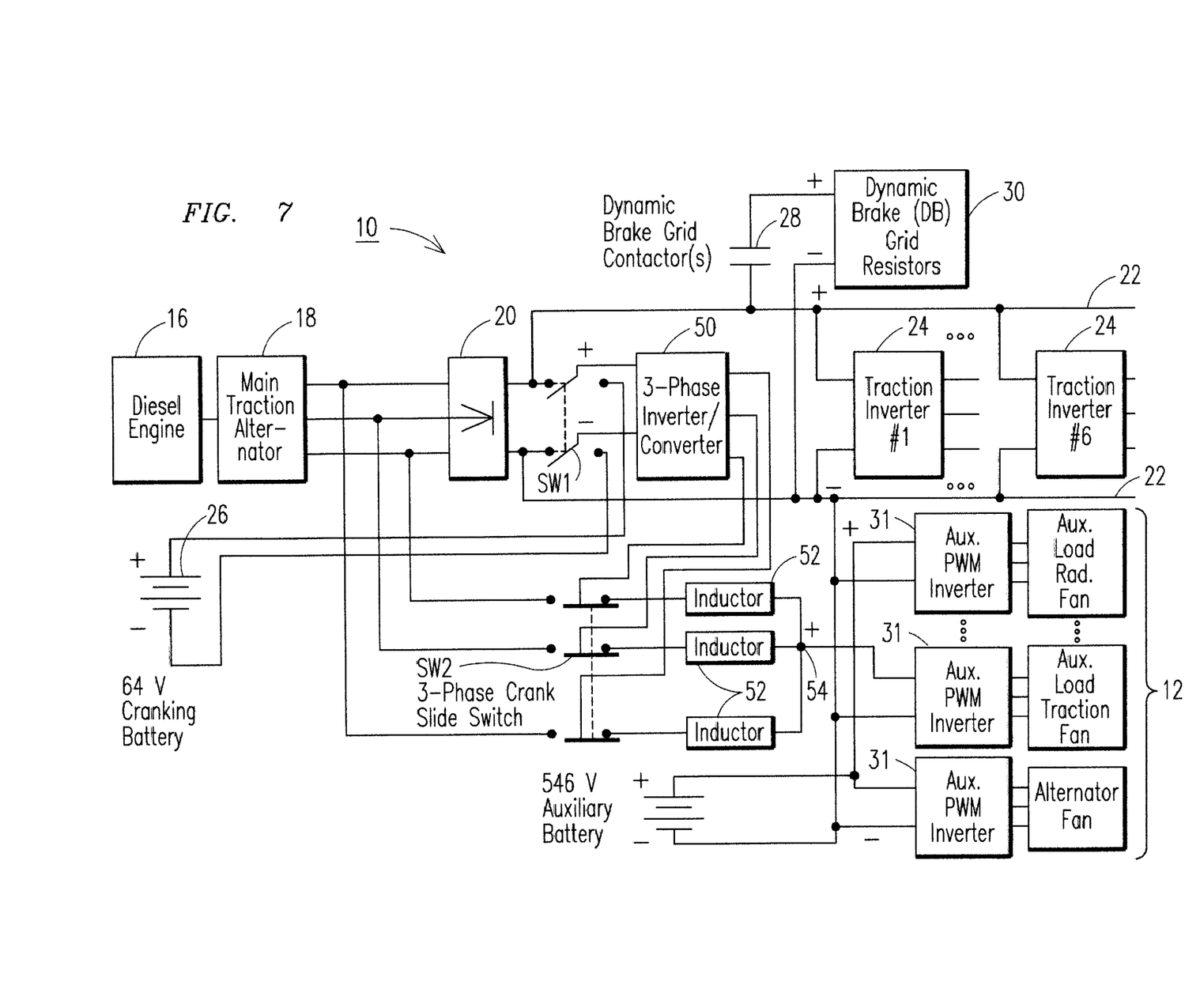
FIG. 7 is block diagram schematic of yet another exemplary embodiment of the power system of the present invention that allows for including a relatively high-voltage storage unit for storing energy that may be captured by the power system.

FIG. 7 shows another embodiment of the power system of the present invention. It will be appreciated that this embodiment allows for coupling a relatively high voltage (e.g., 546 V nominal) energy storage unit 60 to the DC bus powering the auxiliary PWM inverters. In this case the processor of the DC/DC converter may be configured to maintain the state-of-charge (SOC) of the high voltage energy storage unit or battery at a prescribed level. Similar to the embodiments described above, when switch SW1 and SW2 are respectively set to the crank mode and the processor is reconfigured to the traction inverter, this configuration allows the crank operation of the diesel engine using stored energy from the locomotive cranking battery. It will be appreciated by those skilled in the art that some of the advantages believed to be provided by this embodiment include: 1). the additional energy storage will allow additional amount of regenerative brake energy to be captured, 2). The high voltage energy storage will further reduce transients from the auxiliary loads on the diesel engine to reduce engine emissions, and 3). provide for enhanced cooling capability for various locomotive components during tunnel operation.

Figure 8:
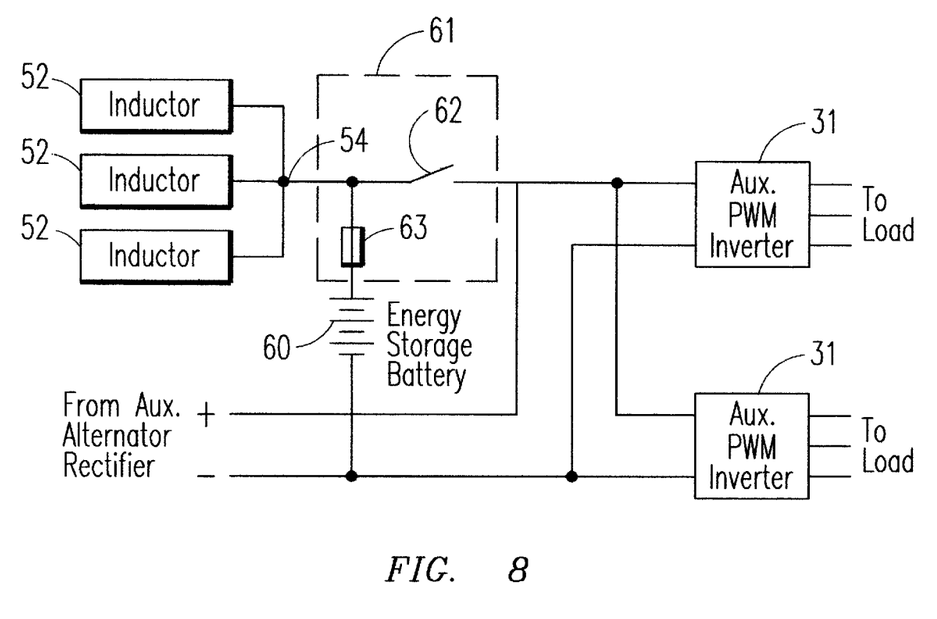
FIG. 8 is a block diagram schematic of an exemplary embodiment that includes a fault isolation network to protect the auxiliary power bus and equipment coupled thereto from detrimental conditions that may develop in the event the power interface unit were to fail.

FIG. 8 shows another embodiment of this invention. Here the embodiment of FIG. 3 is modified to connect the high voltage energy storage unit 60 between the common connection node 54 of the three inductors 52 coupled to each respective converter leg on the DC/DC converter output and the common negative rail of the auxiliary DC subsystem. In this another embodiment, the direct connection from the three-inductor common connection point to the common positive rail of the auxiliary dc system is replaced by a fault isolation network 61 consisting of a fuse 63 in series with the battery plus a switch 62 that, as described below, provides isolation to the auxiliary bus during periods during which high voltage levels could be transmitted to the auxiliary bus through the power interface unit 50, in the event of malfunctions in the interface unit. As suggested above, the energy storage battery 60 enables to capture dynamic braking energy and use the captured energy to power the auxiliary system at least for part of the time using the protecting switch 62 to ensure that during periods of DC/DC converter operation when either a high probability of failure of the power interface unit 50 exists, or immediately after a malfunction of the power interface unit 50 occurs, switch 62 is opened to isolate the auxiliary load, inverters 31 and the motor loads connected thereto. Fuse 63 provides the protection from excessive battery currents in the event that interface unit 50 fails in a mode that creates a short circuit across the energy storage unit. An alternate configuration to protect from excessive battery current would be to replace fuse 63 with a protecting cut-off switch.

It will be appreciated that normal operation of the DC/DC converter allows power flow from the high voltage main traction DC link to the lower auxiliary voltage DC link. The fault isolation network 61, including protective switch 62 as well as other protective components, i.e., fuses or contactors in the battery circuit, can be optionally used to protect against faults in the power interface unit 50. Under normal operation the system can operate with switch 62 in the closed position.

The protecting switch 62 and DC/DC converter operation may be coordinated such that whenever the converter is operating (during periods of high traction DC link voltage which generally occurs during high levels of dynamic braking, and higher tractive power operation, when diesel engine speed is high) the protecting switch 62 will be open to isolate from the interface unit 50 from the auxiliary system positive DC rail and all other inverters and motors connected to the auxiliary positive DC rail. It will be appreciated that this embodiment would protect the auxiliary system inverters and motors from high voltage transient-induced failures. In the mode of high levels of DC link voltage and without a fault being detected, the energy storage battery is charged from the main traction bus during normal operation of the interface unit 50.

To utilize the stored battery energy, in this embodiment, protection switch 62 may be closed to connect the energy storage battery 60 to the auxiliary DC positive and negative DC rails. If the traction bus DC link voltage is above the auxiliary subsystem inverter and/or motor ratings, then the DC/DC converter may be gatedoff to reduce the probability of a failure that if it were to propagate, could damage the components of the auxiliary subsystem by providing a reduced voltage on the auxiliary subsystem. If the traction bus DC link voltage is below the auxiliary subsystem inverter and motor voltage limits, then the DC/DC converter operation may be either continued so as to directly supply all or part of the auxiliary power straight from the traction DC link, or the DC/DC converter may be gated off so that the auxiliary load is shared between the energy storage battery 60 and the rectified output from the auxiliary alternator.

Figure 9:
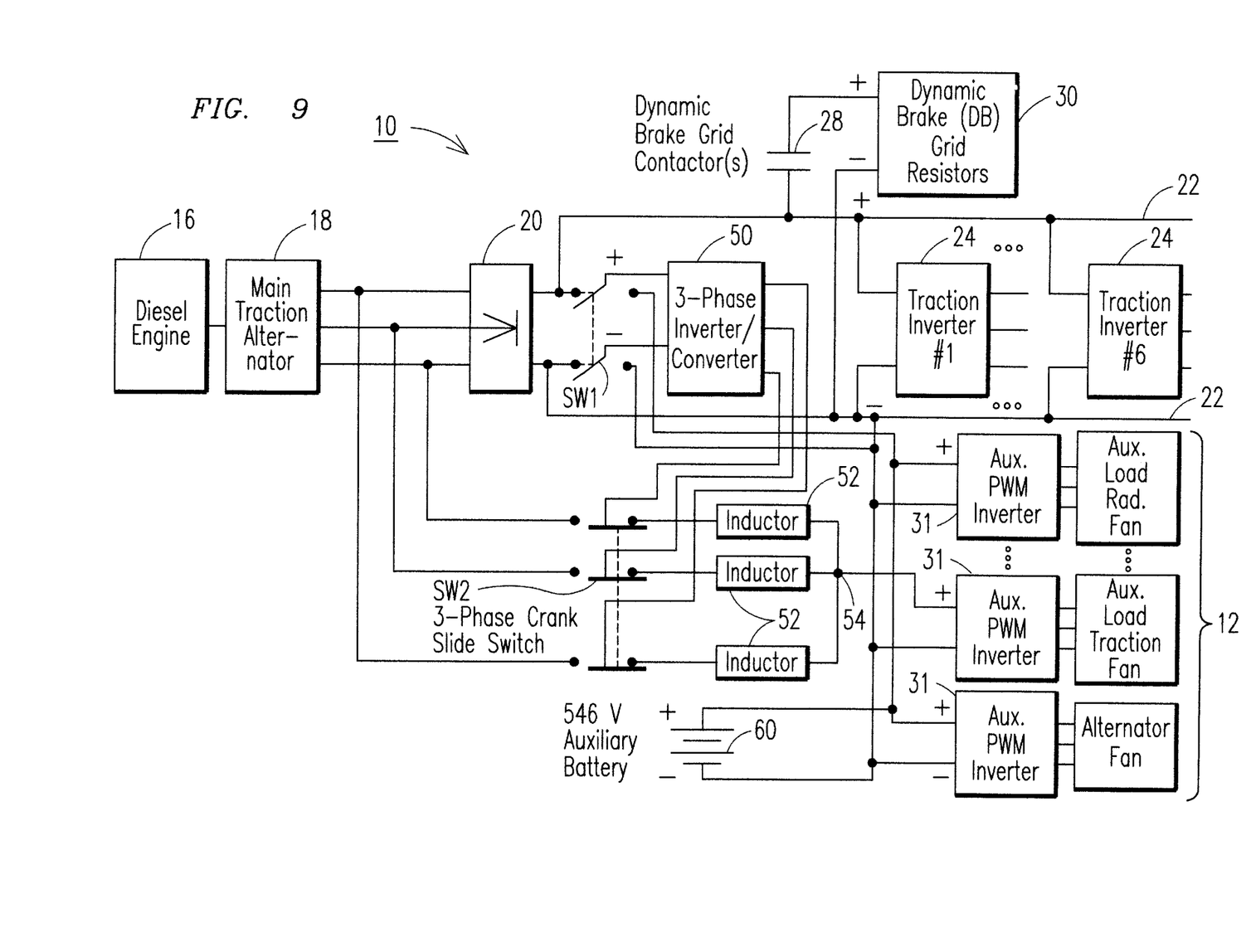
FIG. 9 is a block diagram schematic of still another exemplary embodiment that allows for using the high voltage storage unit of FIG. 7 to power up the interface unit during engine cranking.

FIG. 9 shows yet another embodiment of the present invention. In this embodiment the relatively high voltage energy storage unit (e.g., a 546 V battery) coupled to the DC bus that powers the auxiliary PWM inverters 31 also provides the electrical energy to power interface unit 50 when operating as a traction inverter, during the locomotive diesel engine crank mode of operation. In this embodiment, the relatively low voltage (e.g., 64 V nominal) cranking battery 26 (FIGS. 2 and 3) can be eliminated, or at the very least substantially downsized since it is not required to perform the diesel engine cranking. Improved cycle life of the relatively high voltage energy source 60 is expected in this configuration as compared to the standard configuration that generally requires use of relatively low voltage battery, e.g., a 64 V battery.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power system including an internal combustion engine coupled to drive a main alternator and an auxiliary alternator, the main alternator coupled to power one or more traction motors and the auxiliary alternator coupled to power predetermined electrical equipment, the system comprising:

a main power bus generally powered by the main alternator;

an auxiliary power bus generally powered by the auxiliary alternator; and a power interface unit electrically coupled to the main power bus to capture and transfer electrical energy into the auxiliary power bus, at least some of the electrical energy being generated during a predetermined mode of operation of the system selected from the group consisting of a regenerative braking mode of operation and a self-load mode of operation, the captured and transferred electrical energy being used to directly power, at least in part, the predetermined electrical equipment coupled to the auxiliary power bus, thus enabling less dissipation of heat in one or more resistor grids operatively coupled during regenerative braking or self-load mode of operation.

2. The power system of claim 1 wherein the power interface unit has a voltage converter module selectively coupled to impart a desired voltage conversion to voltage signals propagating between the main power bus and the auxiliary power bus to transfer the captured electrical energy.

3. The power system of claim 2 wherein the voltage converter module comprises a plurality of voltage conversion legs each respectively contributing a respective voltage into the auxiliary power bus.

4. The power system of claim 3 wherein each respective voltage conversion leg is configured to be substantially impervious to faults that may occur in one or more of the other legs of the voltage converter module.

5. The power system of claim 3 wherein each of the conversion legs is coupled to a respective interface inductor through a respective first terminal of the inductor.

6. The power system of claim 5 wherein each interface inductor has a respective second terminal coupled to one another at a common node.

7. The power system of claim 6 further comprising one or more inverters coupled to the voltage converter module through the common node to drive the predetermined equipment using the power captured during the predetermined mode of system operation.

8. The power system of claim 7 wherein each inverter is respectively coupled to receive power from the auxiliary bus whenever the level of voltage from the voltage converter module drops below a predetermined voltage threshold.

9. The power system of claim 7 wherein each inverter comprises an inverter responsive to externally-derived pulse-width modulated control signals.

10. The power system of claim 1 further comprising an energy storage unit coupled to the voltage converter module and to the auxiliary bus so that the energy storage unit stores at least some of the power captured during the predetermined mode of operation of the system.

11. The power system of claim 10 further comprising a fault isolation network interconnected between the voltage converter module, the energy storage unit, and the auxiliary power bus.

12. The power system of claim 10 wherein the energy storage unit, upon reaching a predetermined state of voltage charge, is configured to power the auxiliary bus.

13. The power system of claim 1 wherein the power interface unit further comprises an inverter module selectively coupled to drive the main alternator during an engine cranking mode of operation.

14. The power system of claim 13 wherein the power interface unit receives power from a cranking energy storage unit during the cranking mode of operation.

15. The power system of claim 13 further comprising an energy storage unit coupled to the voltage converter module and to the auxiliary bus so that the energy storage unit stores the power captured during the predetermined mode of operation of the system and wherein the power interface unit receives power from the energy storage unit during the cranking mode of operation.

16. The power system of claim 15 wherein the energy storage unit is rated to have a sufficiently high voltage to power the auxiliary bus in the absence of any auxiliary alternator.

17. In a power system including an internal combustion engine coupled to drive a main alternator and an auxiliary alternator, the main alternator coupled to power through a main power bus one or more traction motors and the auxiliary alternator coupled to power through an auxiliary power bus predetermined electrical equipment, a power interface unit electrically coupled to the main power bus to capture and transfer electrical energy into the auxiliary power bus, at least some of the electrical energy being generated during a predetermined mode of operation of the system, the power interface unit comprising;

a voltage converter module selectively coupled to impart a desired voltage conversion to voltage signals propagating between the main power bus and the auxiliary power bus to transfer the captured electrical energy, wherein the voltage converter module comprises a plurality of voltage conversion legs each respectively contributing a respective voltage into the auxiliary power bus, each of the conversion legs being coupled to a respective interface inductor through a respective first terminal of the inductor, each interface inductor having a respective second terminal coupled to one another at a common node;

at least one inverter being coupled to the voltage converter module through the common node to drive the predetermined equipment on the auxiliary power bus at a selectable variable frequency independently of the RPM of the engine using the power captured during the predetermined mode of system operation; and an inverter module selectively coupled to drive the main alternator during an engine-cranking mode of operation.

18. The power interface unit of claim 17 wherein the predetermined mode of system operation comprises a regenerative braking mode of operation.

19. The power interface unit of claim 17 wherein the predetermined mode of system operation comprises a self-load mode of operation.

20. The power interface unit of claim 17 wherein each respective voltage conversion leg is configured to be substantially impervious to faults that may occur in one or more of the other legs of the voltage converter module.

21. The power interface unit of claim 17 wherein each inverter is respectively coupled to receive power from the auxiliary bus whenever the level of voltage from the voltage converter module drops below a predetermined voltage threshold.

22. The power interface unit of claim 17 wherein each inverter comprises an inverter responsive to externally-derived pulse-width modulated control signals.

23. The power interface unit of claim 17 wherein an energy storage unit is coupled to the voltage converter module and to the auxiliary bus so that the energy storage unit stores at least some of the power captured during the predetermined mode of operation of the system.

24. The power interface unit of claim 23 further comprising a fault isolation network interconnected between the voltage converter module, the energy storage unit, and the auxiliary power bus.

25. The power interface unit of claim 17 wherein the energy storage unit, upon reaching a predetermined state of voltage charge, is configured to power the auxiliary bus.

26. The power interface unit of claim 25 wherein a cranking energy storage unit supplies power to the inverter module of the interface unit during the cranking mode of operation.

27. The power interface unit of claim 25 wherein an energy storage unit is coupled to the voltage converter module and to the auxiliary bus so that the energy storage unit receives the power captured during the predetermined mode of operation of the system and wherein the inverter module of the power interface unit receives power from the energy storage unit during the cranking mode of operation.

28. The power interface unit of claim 27 wherein the energy storage unit is rated to have a sufficiently high voltage to power the auxiliary bus in the absence of any power from the auxiliary alternator.

29. A power system including an internal combustion engine coupled to drive a main alternator and an auxiliary alternator, the main alternator coupled to power one or more traction motors and the auxiliary alternator coupled to power predetermined electrical equipment, the system comprising:

a main power bus generally powered by the main alternator;

an auxiliary power bus generally powered by the auxiliary alternator;

a power interface unit electrically coupled to the main power bus to capture and transfer electrical energy into the auxiliary power bus, at least some of the electrical energy being generated during a predetermined mode of operation of the system, wherein the power interface unit has a voltage converter module selectively coupled to impart a desired voltage conversion to voltage signals propagating between the main power bus and the auxiliary power bus to transfer the captured electrical energy to at least one of the following: the equipment on the auxiliary bus and an energy storage device; and     at least one inverter coupled to the voltage converter module through a common node to drive the predetermined equipment using the power captured during the predetermined mode of system operation and provide selectably variable speed control to said equipment while decoupling undesired speed variation due to changes in rotational speed of the engine.

\* \* \* \* \*